INVENTOR
Lester L. Knight, Jr.
BY Shoemaker and Mattare
ATTORNEYS

June 18, 1968  L. L. KNIGHT, JR  3,388,880
FLEXIBLE BEARING SUPPORT

Filed April 3, 1967  2 Sheets-Sheet 2

INVENTOR
Lester L. Knight, Jr.
BY Shoemaker and Mattare
ATTORNEYS

United States Patent Office 3,388,880
Patented June 18, 1968

3,388,880
FLEXIBLE BEARING SUPPORT
Lester L. Knight, Jr., Newport News, Va., assignor to Newport News Shipbuilding and Dry Dock Company, Newport News, Va., a corporation of Virginia
Filed Apr. 3, 1967, Ser. No. 628,052
10 Claims. (Cl. 248—2)

ABSTRACT OF THE DISCLOSURE

The support comprises two substantially complementary halves which are bolted together. A central inner annular portion is adapted to support a bearing about a shaft. Studs extend upwardly from this inner support portion for connecting the bearing in place. An intermediate portion comprises an annular radially outwardly extending plate means having a plurality of access holes formed therein. A plurality of radially extending gusset plates are connected between the intermediate portion plate means and the inner bearing support portion for reinforcing the structure. These first-mentioned gusset plates are connected with the intermediate plate means above the plate means. A further plurality of reinforcing gusset plates are connected between the undersurface of the intermediate portion plate means and the inner bearing support portion. An annular flexible web portion is secured along one edge thereof to the intermediate portion plate means adjacent the outer periphery thereof, the web portion extending perpendicular thereto. An annular flange portion is connected at the inner periphery thereof to the opposite edge of the web portion and extends radially outwardly of the web portion. The flange portion extends substantially perpendicular to the web portion and parallel with the intermediate portion plate means. The flange portion is provided with a plurality of holes for securing the flange portion to a suitable supporting surface.

Background of the invention

The bearing support of the present invention is adapted to support bearings used in association with the shafts of pumps and turbines, and particularly hydraulic turbines and the like.

Pump and turbine bearings are mounted on head covers which are disposed concentrically about the shaft to be supported in the bearing. These head covers are subjected to concentric radial deflections due to the fact that they contain water under pressure. Such radial deflections of the supporting head covers are transferred as deflections of the shaft bearing with prior art structures thereby upsetting the bearing-shaft clearance and requiring an undesirably large bearing hold-down joint. Furthermore, it is important that the side load stiffness of the bearing support be sufficiently great so that the bearing will not deflect much due to bearing side load thereby helping to restrain the shaft from deflecting, thus allowing small seal clearances in the associated rotating structure.

Summary of the invention

The flexible bearing support of the present invention is so designed that deflections of the supporting means or head cover are not transferred to the bearing itself, but rather the flexible web portion of the bearing support is adapted to be deformed to compensate for such deflections. With this flexible arrangement in the bearing support itself, the bearing-shaft clearance is not upset, and there is no necessity for providing an undersirably large bearing hold-down joint.

The over-all construction of the bearing support of the present invention while being flexible in nature at the same time has a side load stiffness substantially greater than that of the bearing oil film so that the beairng will not deflect much due to bearing side load. This will accordingly help to restrain the shaft from deflecting and allow small seal clearance to be maintained in the rotating structure.

An object of the present invention is to provide a new and novel flexible bearing support which allows concentric radial expansion of the support means without affecting the bearing clearance or changing the position of the bearing and allowing very little side load deflection due to bearing side loads.

Description of the preferred embodiment

Figure 1:
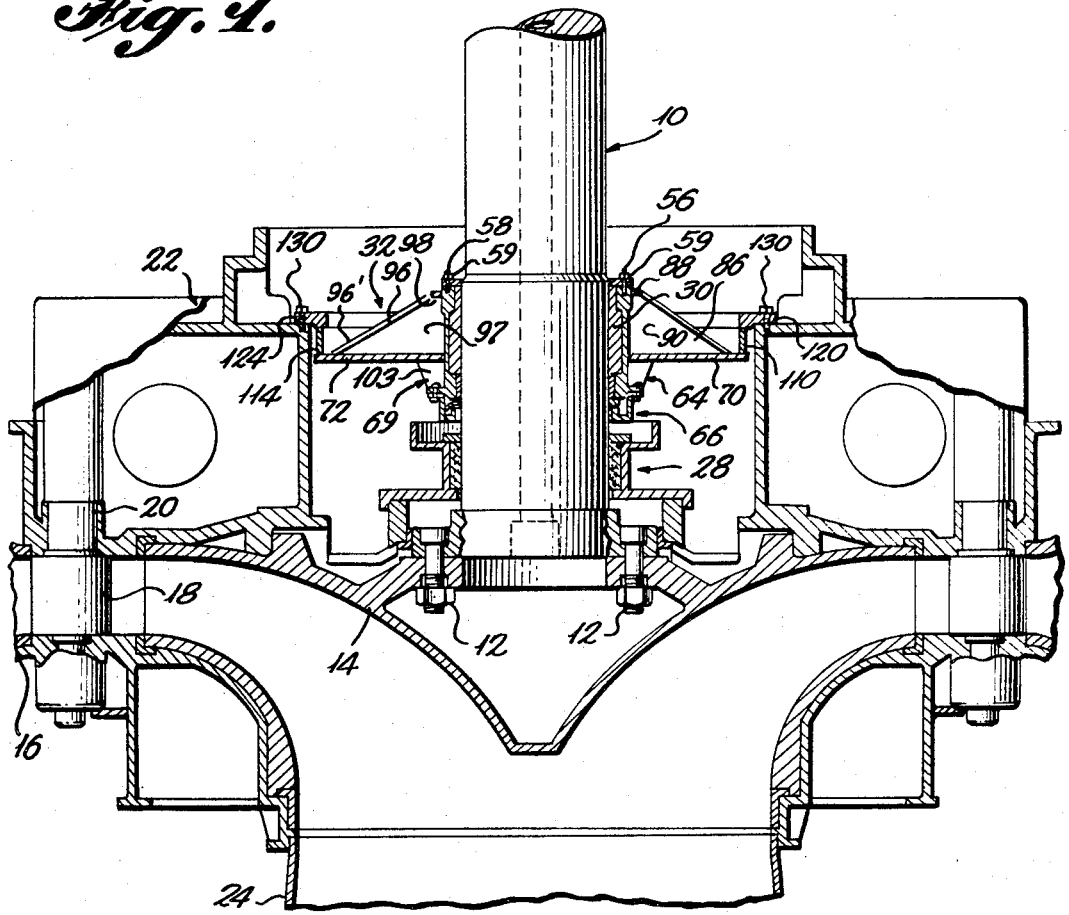
FIG. 1 is a longitudinal sectional view through a hydraulic turbine incorporating the flexible bearing support of the present invention.

Referring now to the drawings wherein like reference characters designate corresponding parts throughout the several views, FIG. 1 illustrates a hydraulic turbine of conventional construction including a shaft 10 which is connected by means of nut and bolt assemblies 12 with a runner 14. A spiral casing 16 is adapted to feed water through the adjustable guide vanes 18 into the runner. The guide vanes are mounted upon a spindle 20 which is supported for rotation within a head cover indicated by reference numeral 22.

A draft tube 24 is disposed beneath the runner for receiving water discharged therefrom. A conventional shaft seal or packing is indicated generally by reference numeral 28. A bearing for supporting and guiding rotation of shaft 10 is indicated by reference numeral 30, and the flexible bearing support of the present invention is indicated generally by reference numeral 32, this bearing support comprising the novelty of the instant application.

Figure 3:
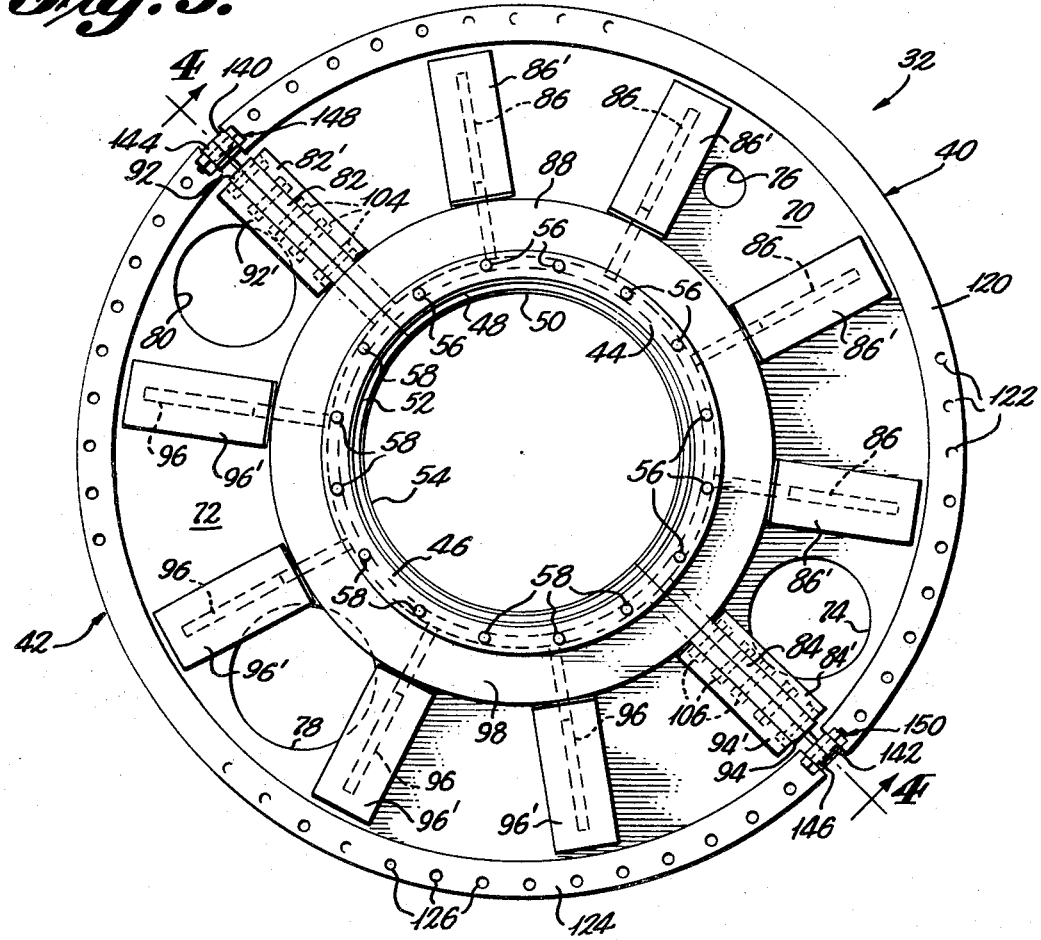
FIG. 3 is a top view of the flexible bearing support of the present invention.
Figure 4:
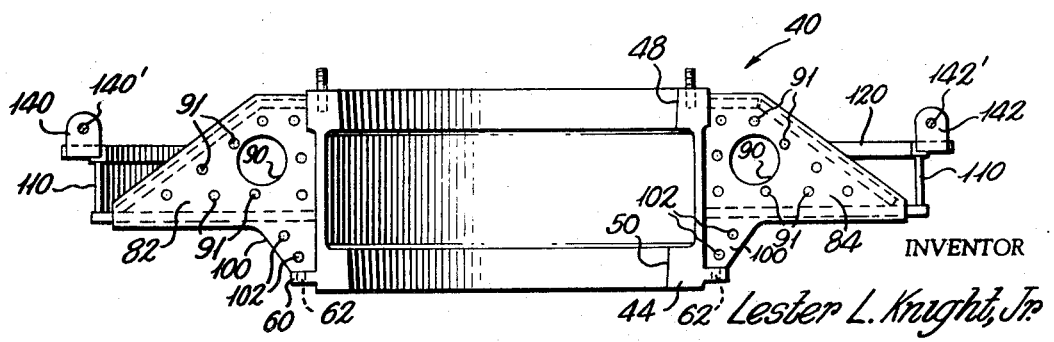
FIG. 4 is a view of one half of the bearing support taken along line 4—4 of FIG. 3 looking in the direction of the arrows.

Referring now to FIGS. 3 and 4, the construction of the flexible bearing support may be clearly understood. The bearing support comprises two substantially complementary halves 40 and 42 each of which extends through an arc of substantially 180° as seen in FIG. 3, the two halves being rigidly secured to one another as by nut and bolt assemblies hereinafter described. This construction wherein the support is formed of two halves enables the bearing support to be readily assembled about an associated shaft.

Portion 40 of the bearing support includes an inner annular bearing support portion 44 defining spaced inner surfaces 48 and 50 which define portions of a frusto-conical surface, these surfaces being adapted to engage and support spaced portions of the outer surface of the bearing previously described. Portion 42 of the bearing support includes a similar bearing support portion 46 having spaced inner surfaces 52 and 54 corresponding to surfaces 48 and 50.

Figure 2:
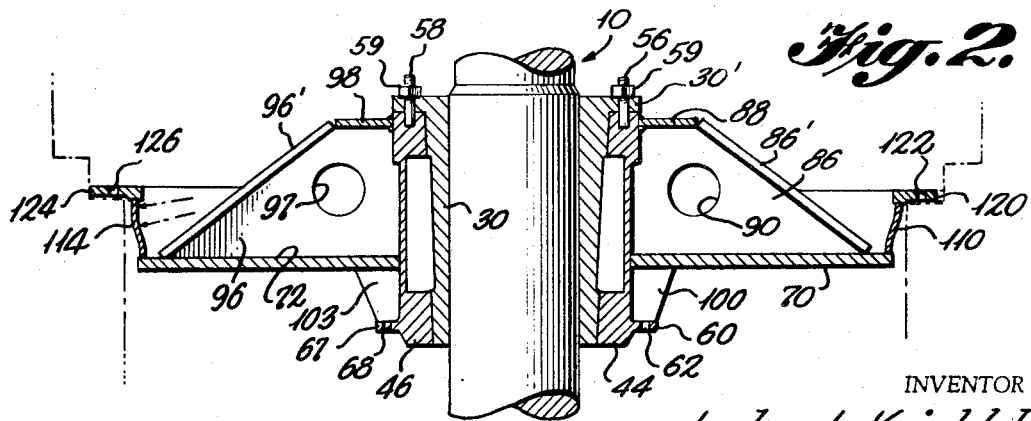
FIG. 2 is an enlarged cross sectional view similar to that of FIG. 1 illustrating the bearing support structure, and illustrating the manner in which the web portion thereof is adapted to be deformed upon concentric radial deflection of the head cover upon which the bearing support is mounted.

A plurality of threaded studs 56 are fixed to and extend from the upper part of the inner bearing support portion 44, a similar plurality of studs 58 extending from the upper part of the inner bearing support portion 46. These studs as seen in FIG. 2 are adapted to fit through suitable holes provided in a flange 30' formed at the upper end of the bearing 30. Nuts 59 are illustrated as being threaded onto the studs 56 and 58 for securing the bearing in place relative to the bearing support.

A flange 60 extends peripherally around the lower part of the inner bearing support portion 44, this radially outwardly extending flange having a plurality of spaced holes 62 formed therethrough. These holes are adapted to receive suitable attaching means such as nut and bolt assemblies as indicated by reference numeral 64 in FIG. 1 for supporting an oil flinger indicated by reference numeral 66, this oil flinger being of conventional construction. It should be understood that a similar flange 67 having holes 68 formed therethrough is formed around the lower part of the inner bearing portion 46 of the other half of the bearing support for a similar purpose. As seen in FIG. 1, these latter holes receive nut and bolt assemblies 69 for supporting the oil flinger.

Referring again to FIGS. 3 and 4, the flexible bearing support includes intermediate portions 70 and 72 which cooperate to define an annular plate means, the inner periphery of portions 70 and 72 being rigidly secured to the outer surfaces of portions 44 and 46 respectively as by welding or the like. A pair of spaced circular access holes 74 and 76 are provided through portion 70, and a pair of access holes 78 and 80 are provided through portion 72, it being apparent that any suitable number of access holes may be provided as required.

A pair of reinforcing gusset plates 82 and 84 are disposed along opposite edge portions of intermediate portion 70, and a plurality of further similar gusset plates 86 are angularly spaced about portion 70. These gusset plates are connected along the radially inner edges thereof with the outer surface of the inner bearing support portion 44 as by welding or the like, the undersurfaces of the various gusset plates being rigidly secured as by welding to the upper surface of portion 70. Six of these reinforcing gusset plates are illustrated, although the number may be varied as required.

Plates 82' and 84' are secured to plates 82 and 84 respectively and extend laterally therefrom to rigidify the structure. Plates 86' are rigidly secured as by welding to the sloping outer surfaces of gusset plates 86 to further rigidify the structure. An arcuate plate 88 is rigidly secured as by welding to the upper surface of each of the aforementioned gusset plates to provide further rigidity to the arrangement.

As seen most clearly in FIG. 4, the gusset plates may each be provided with a hole 90 disposed at an intermediate point thereof, and the gusset plates 82 and 84 are further provided with a plurality of holes 91 formed therethrough for receiving nut and bolt assemblies hereinafter described for securing the two halves of the bearing support together.

As seen in FIG. 3, the opposite edges of portion 72 are provided with gusset plates 92 and 94, while a plurality of gusset plates 96 are angularly spaced about portion 72. Plates 92' and 94' are secured to and extend laterally of gusset plates 92 and 94, while plates 96' are secured to the outwardly sloping surfaces of the gusset plates 96. These plates serve to reinforce the arrangement, the various gusset plates associated with portion 42 of the bearing support being of substantially identical construction and arrangement to those discussed in connection with portion 40 of the bearing support.

An annular plate 98 corresponds to the plate 88 previously described and is rigidly affixed to the upper portion of the gusset plates association with the portion 42 of the bearing support to further rigidify the structure. The various gusset plates associated with portion 42 of the bearing support are provided with holes 97 as seen in FIG. 2 similar to holes 90 previously described, and plates 92 and 94 are provided with a plurality of holes similar to the holes 91 previously described in connection with the description of plates 82 and 84 for receiving the nut and bolt assemblies to hold the two halves of the bearing support together.

As seen in FIG. 4, portion 40 of the bearing support is also provided with a plurality of gusset plates 100 which are adapted to be disposed directly below the gusset plates previously described in connection with portion 40. The radial inward edges of gusset plates 100 are rigidly secured as by welding to the outer surface of portion 44, while the upper edges of these gusset plates are rigidly secured to the undersurface of intermediate portion 70. These latter gusset plates further serve to rigidify the structure and gusset plates 100 immediately beneath plates 82 and 84 are provided with a plurality of holes 102 therethrough for receiving the nut and bolt assemblies hereinafter described. Gusset plates 103 similar to plates 100 are also provided on portion 42 of the bearing support for a similar purpose.

Referring now to FIG. 3, a plurality of nut and bolt assemblies 104 extend through the aligned holes provided in gusset plates 82 and 92 as well as the lower gusset plates 100 and 103 which are immediately therebelow. Similar nut and bolt assemblies 106 extend through the aligned holes in plates 84 and 94 and the lower gusset plates 100 and 103 disposed immediately therebelow. These nut and bolt assemblies serve to rigidly secure the two halves of the bearing support to one another.

An arcuate web portion 110 is provided on portion 70, this web portion being secured as by welding along the lower edge thereof to the upper surface of intermediate portion 70 of portion 40 of the bearing support. Web portion 110 is secured to portion 70 adjacent the outer periphery thereof and extends substantially perpendicular thereto. This web portion is of such a construction as to have suitable flexibility so as to deform under the loads encountered during use of the associated turbine. A similar web portion 114 is connected with intermediate portion 72 of portion 42 of the bearing support whereby the two web portions cooperate to form an annular web extending completely around the over-all bearing support.

In a typical example wherein the intermediate portion of the over-all bearing support, including portions 70 and 72, has an outer diameter of approximately 10½ feet, the web portions may have a thickness extending radially of the bearing support of approximately ½ inch while it may have a length extending in a direction perpendicular to the intermediate portion of the bearing support and longitudinally of the over-all bearing support of approximately 8 inches. It is accordingly apparent that the web has a length-to-thickness ratio of approximately 16:1 in this example. This thickness ratio may vary, and should lie within the range of approximately 6:1 to 20:1 in order to provide the desired improved results of the present invention. When the web is formed of steel having these relative dimensions, the web will have sufficient flexibility to enable deflections of the associated head cover without causing undesired deflections of the bearing supported by the bearing support.

An arcuate flange portion 120 is provided on portion 40 of the bearing support, this flange portion being secured adjacent the inner periphery thereof to the upper edge of web portion 110 as by welding or the like. Flange portion 120 extends substantially perpendicular to the web portion 110 and substantially parallel with the intermediate portion plate means 70. Flange portion 120 has a plurality of holes 122 formed therethrough.

A similar flange portion 124 is secured to the web portion of the portion 42 of the bearing support in a manner similar to that in which the flange portion 120 is secured to web portion 110. Flange portion 124 has a plurality of holes 126 formed therethrough. The holes formed in the flange portions are adapted to receive cap screws 130 as shown in FIG. 1 which are threaded through the holes in the flange into correspondingly threaded holes provided in the head cover for securing the bearing support of the present invention in operative position upon the head cover.

Referring again to FIGS. 3 and 4 attaching brackets 140 and 142 are secured to opposite ends of flange 120 as by welding or the like, these ataching brackets having holes 140' and 142' respectively formed therethrough. Similar attaching brackets 144 and 146 are secured to the opposite ends of flange 124, and are also provided with holes formed therethrough.

As seen in FIG. 3, a first nut and bolt assembly 148 is secured through the holes provided in brackets 140 and 144, and a nut and bolt assembly 150 is secured through the holes provided in brackets 142 and 146. These last two mentioned nut and bolt assemblies further serve to rigidly interconnect the two halves of the over-all bearing.

The various components of the bearing support of the present invention are formed of a suitable rigid substance such as steel or the like adapted to withstand the relatively heavy loads applied during the operation of a large hydraulic turbine.

FIGURE 1 illustrates the flexible bearing support of the present invention mounted in operative position wherein the support is secured to the head cover, while the bearing 30 surrounding shaft 10 is supported by the inner bearing support portion of the present invention.

Referring now to FIG. 2, an enlarged sectional view is shown of the structure illustrated in FIG. 1 demonstrating the manner in which the flexible web portions 110 and 114 are adapted to deflect upon concentric radial deflection of the associated head cover. It will be noted that the web portions are adapted to be bent at an intermediate portion thereof as seen in cross section in FIG. 2 thereby enabling the flange portions 120 and 124 to remain attached to the head cover, while the inner bearing support portions 44 and 46 of the apparatus remain in substantially the same position relative to shaft 10, thereby properly supporting the bearing 30 in operative relationship.

It is apparent from the foregoing that there is provided according to the present invention a new and novel flexible bearing support which allows concentric radial expansion of the support means such as a head cover or the like without affecting the bearing clearance or changing the position of the bearing, and further which allows very little side load deflection due to bearing side loads.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A flexible bearing support including an inner bearing support portion of generally annular configuration, an intermediate portion of generally annular configuration secured to said inner bearing support portion and extending radially outwardly therefrom, a web portion of generally annular configuration, said web portion being of flexible construction, said web portion being secured along one edge thereof to said intermediate portion, a flange portion secured to the opposite edge of said web portion and extending laterally of said web portion, said flange portion including means for securing the flange portion to a suitable supporting means.

2. Apparatus as defined in claim 1 wherein said web portion extends substantially perpendicular to said intermediate portion.

3. Apparatus as defined in claim 2 wherein said web portion is secured to said intermediate portion adjacent the outer periphery of said intermediate portion.

4. Apparatus as defined in claim 1 wherein said web portion has a certain thickness and a certain length extending between said intermediate portion and said flange portion, the ratio of said length to said thickness being in the range of about 6:1 to 20:1.

5. Apparatus as defined in claim 1 wherein said flange portion is secured adjacent the inner periphery thereof to said web portion and extends substantially perpendicular to said web portion.

6. Apparatus as defined in claim 5 wherein said flange portion extends radially outwardly of said web portion and in a direction substantially parallel with said intermediate portion.

7. Apparatus as defined in claim 1 wherein said support comprises two substantially complementary halves, and means for rigidly securing said halves to one another.

8. Apparatus as defined in claim 1 wherein said intermediate portion comprises an annular plate-like member, reinforcing means being connected between said intermediate portion and said inner bearing support portion.

9. Apparatus as defined in claim 8 wherein said web portion is secured to said intermediate portion adjacent the outer periphery of said intermediate portion and extends substantially perpendicular thereto.

10. Apparatus as defined in claim 9 wherein said flange portion extends radially outwardly of said web portion in a direction substantially perpendicular to said web portion and substantially parallel with said intermediate portion.

References Cited

UNITED STATES PATENTS

| | | | |
|---|---|---|---|
| 1,869,118 | 7/1932 | Reist | 308—22 |
| 2,748,789 | 6/1956 | Nelson | 248—18 XR |
| 2,915,075 | 12/1959 | Conrad | 248—2 XR |
| 3,047,345 | 7/1962 | Burton et al. | 308—28 |
| 3,330,515 | 7/1967 | Janssen et al. | 248—26 |

JOHN PETO, *Primary Examiner.*